Feb. 20, 1934.    H. A. BRASSERT ET AL    1,947,447
APPARATUS FOR THE FILTRATION OF AIR OR GASES
Filed Jan. 11, 1932    2 Sheets-Sheet 2
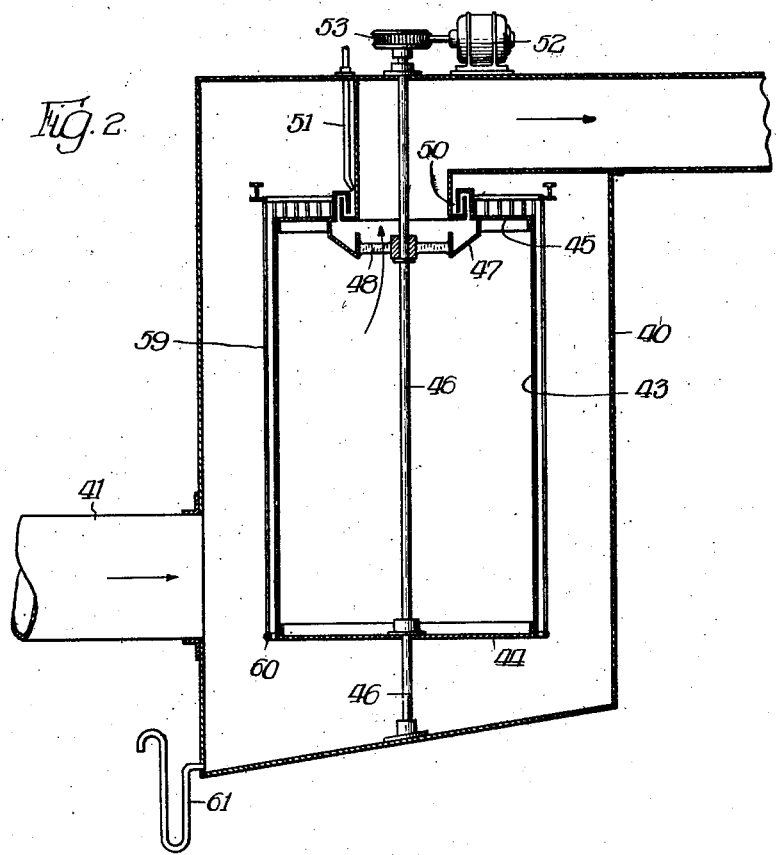
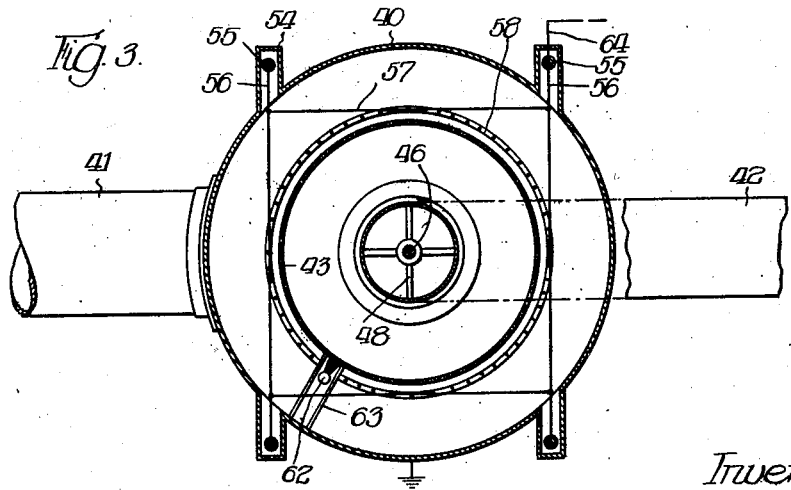
Inventors:
Herman A. Brassert,
Arthur J. Boynton,
John P. Grilli.

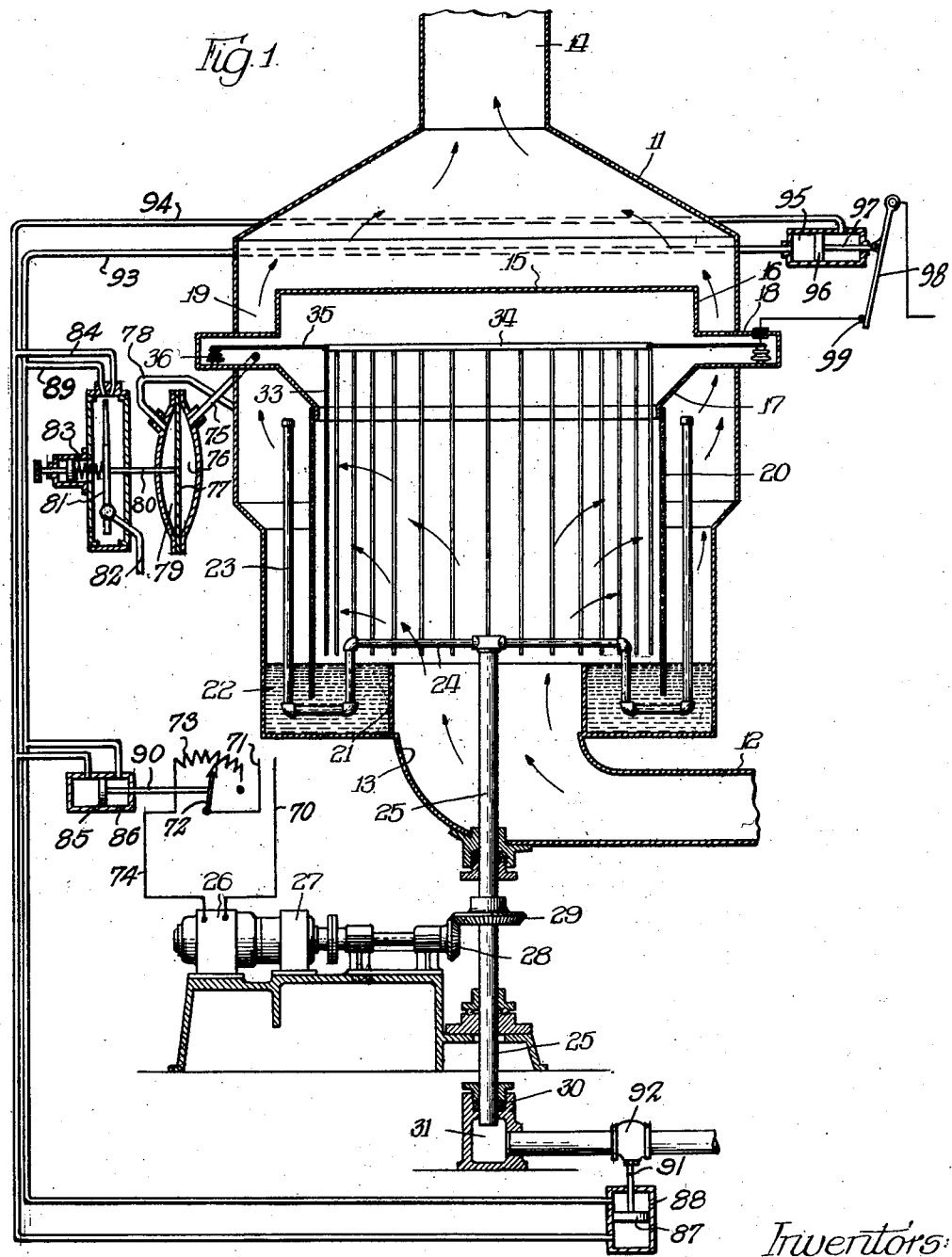

Patented Feb. 20, 1934

1,947,447

UNITED STATES PATENT OFFICE 1,947,447

APPARATUS FOR THE FILTRATION OF AIR OR GASES

Herman A. Brassert, Arthur J. Boynton, and John P. Grilli, Chicago, Ill., assignors to H. A. Brassert & Company, Chicago, Ill., a corporation of Illinois Application January 11, 1932. Serial No. 585,821

5 Claims. (Cl. 183—7)

This invention relates to an apparatus for the filtration of air or gases for the purpose of the removal therefrom of contained solids and liquids, including those of the finest size. It is common practice to filter gases and air through various screening devices, or through filter bags, but these means of filtration are either too coarse or else they gradually become obstructed and require removal and cleaning, which results in interrupting their operation.

Our invention overcomes these difficulties by increasing the filtering action of a medium through electrical charging of the dust or liquid particles and by cleaning the filter either continually or intermittently. The cleaning may be performed either by backwashing with a revolving spray of gas or fluid against the filter or by revolving the filter itself against a stationary spray of gas or liquid. The screen or filter is grounded and acts as a receiving electrode. The cleaning fluid, if a gas, may be taken from the main stream of gases to be filtered, after raising it to sufficient pressure to accomplish the object or other means may be used, as for instance, a water spray, or air, or steam, or other gas under pressure. The purging spray is preferably applied in counter-flow to the filtering fluid. If desired, it may also be sprayed in the direction of the fluid passing through the filter, or it may be advisable to apply the sprays on both sides of the filter with and counterwise to the direction of the flow.

Spraying the filter in counterflow to the gas is effective in itself for cleaning the filter medium of deposited material. By also spraying in the direction of the flow of gas the purging action is increased, as a portion of the materials is washed off the screen on entering. Finer materials are forced through the screen and are then washed off by the spray on the discharge side. We have found, however, that even with the finest screens some of the dust will go through the filter unless the filter medium is of a tight weave and of a nature so as to cause the dust to form a mat on its surface. In that case, the capacity of the filter is, however, very small and a very large filtering surface is required to handle large quantities of gas. We have found that by electrical charging of the dust particles more open filtering mediums can be used, the flow of gas through the filter can be greatly increased and yet substantially no dust will pass through the filtering medium.

It is an object of the present invention to provide a new and improved apparatus for filtering of air or gases.

It is a further object to provide an apparatus whereby the finest particles of dust may be removed without material delays in operation for cleaning the filtering medium.

It is also an object to provide an apparatus in which an ionization of the dust is used to add a deposit of dust on the filtering medium, which is a grounded permeable metallic member.

It is an additional object to provide a construction in which the filtering medium and washing sprays are movable relative to each other.

Other and further objects will appear as the description proceeds.

We have shown certain preferred embodiments of our invention in the accompanying drawings, in which—

Figure 1 is a vertical section through one form of constrution;

Figure 2 is a vertical section through a second form of construction; and

Figure 3 is a horizontal section of the form of construction shown in Figure 2.

Referring first to the form of construction shown in Figure 1, the gas cleaning apparatus comprises an outer metallic housing 11 having an inlet passage 12 opening at 13 into the base of the housing. An offtake passage 14 leads from the upper end of the housing. A circular closure member 15 is located within the housing, having downturned portions 16 and inturned lower edges 17. The member 15 is supported in the housing by outwardly extending hollow arms 18 which extend through and are secured to the housing wall. It will be apparent that except for the space occupied by the hollow arms 18, there will be a circular passage space 19 surrounding the closure 15.

The circular filter screen 20 is secured to the lower edge of the member 17. A water-tight closure ring 21 is secured to the lower wall of the housing surrounding the opening 13. This ring 21 maintains the water 22 at a level such as to cover the lower edge of the screen 20. The vertically extending spray arms 23 are carried by the horizontally extending arms 24 which are secured to the rotating shaft 25. This shaft 25 is driven by motor 26 through the reduction gear 27 and the beveled gears 28 and 29. The lower end of the hollow shaft 25 extends through gland 30 into the housing 31 and the water-supply pipe 32 leads to this housing. It will be understood that the vertical arms 23 are perforated so as to direct a spray against the screen 20. The vertically extending electrodes 33 hang down from the ring 34 which is supported by the rods 35 secured to insulators 36 located in the hollow arms 18. A wire 37 leads from one rod 35 to a source of high tension current.

The wire 70 leads from an external source of electric power to the motor 26. The wire 71 leads to the movable arm 72 of the rheostat which includes the resistance 73 and which is connected to the motor by wire 74.

The pipe 75 leads from the intake chamber to the chamber 76 adjacent one side of diaphragm 77. The pipe 78 leads from the outlet chamber to the chamber 79 on the other side of the diaphragm 77. The push rod 80 is moved by movement of diaphragm 77 and its other end engages a swinging nozzle 81 which is fed with liquid under pressure through pipe 82. The adjustable spring 83 acts against the thrust of the rod 80. The pipe 84 leads from a point adjacent the discharge end of the nozzle 81 to one side of the piston 85 in cylinder 86 and also to one side of the piston 87 in cylinder 88. The pipe 89 leads from adjacent the discharge end of nozzle 81 to the other sides of pistons 85 and 87. Piston 85 is connected by arm 90 to the rheostat arm 72. Piston 87 is connected to the stem 91 of valve 92 controlling flow through the fluid pipe 32. The pipe 94 is connected to the pipe 84 and leads to the right hand end of cylinder 95 containing piston 96. The pipe 93 leads from pipe 89 to the left end of cylinder 95. The piston 96 is provided with rod 97 engaging switch arm 98 adapted to make or break contact with the contact 99 in the circuit to the discharge electrodes 33.

In the operation of this form of apparatus, it will be apparent that the dust-laden air or gas flows in through passage 12, up through opening 13, thence past the electrodes 33 where the dust particles are ionized. These ionized particles then pass against the screen 20 and the cleaned gas passes through the screen up through the annular passage 19 and through the upper portion of the housing and through the outlet passage 14.

The automatic control will operate upon the drop of pressure between the intake and discharge of the cleaning screen. When this drop becomes large the motor 26 is put in operation and rotates the cleaning jet pipes 23. Also the valve 92 is automatically opened to permit flow of the cleaning fluid. When the screen is cleaned, the motor is stopped and the flow cut off. The control may also act to control the speed of rotation and amount of flow of cleaning fluid in addition to starting and stopping the cleaning operation.

The control also serves to open and close the circuit to the discharge electrodes. The switch 98 is normally closed but when the pressure difference builds up sufficiently to operate the washing apparatus, it may also serve to open the switch by pressure through pipe 93 into the left end of cylinder 95 against the piston 96. When the screen is cleaned and the pressure difference drops, then pressure through pipe 94 will again close the switch. The switch may be arranged to open when the spray pressure is high due to valve 92 being wide open or the switch may be arranged to open whenever valve 92 is opened at all.

Referring next to the form of construction shown in Figures 2 and 3, the housing 40 is provided with an inlet passage 41 and the upper outlet passage 42. A screen 43 is supported at its lower end by the circular member 44 and at its upper end by the member 45. The member 44 is fixedly secured to the rotating shaft 46 and serves as a closure for the lower end of the screen cylinder. The upper member 45 has a depending portion 47 which is secured to the shaft 46 by a spider 48, the spider being comparatively open and permitting the upward flow of the gases. The member 45 is also provided with an upwardly and downwardly directed flange 49, the downwardly directed edge of this flange fitting into the recess 50 formed by the lower edges of the inner end of the offtake passage 42. The pipe 51 is used to direct a flow of water into the recess 50, this water coacting with the flange 49 to form a water seal. The motor 52 and gear 53 constitute a drive for the shaft 46.

As best seen in Figure 3, the housing 40 is provided with the downwardly extending hollow arms 54, each of which holds an insulator 55 and rods 56 which serve to support a square frame 57. This square frame in turn serves to support the ring 58 from which depend a plurality of electrodes 59, their lower ends being secured to the ring 60. The pipe connection 61 is provided for draining the water and its entrained dust from the lower end of the housing.

A vertically extending spray pipe 62 is located adjacent the outer surface of the screen 43 as shown in Figure 3, and vertically extending guard members 63 are located on either side of the pipe 62. The guard members extending adjacent the screen 43 prevent spray from the pipe 62 reaching the adjacent high tension electrodes. A conductor 64 leads from one of the rods 56 to a source of high tension electric current, and the housing is grounded.

In both forms of construction the gas passes through a highly charged electric field where dust and water particles receive an electric charge opposite the polarity to the discharge electrodes, which comprise the screen assembly. This gas then passes through the filter medium which is grounded and thereby the gas loses its impurities to the filtering medium. In the course of time, if this filter medium were not washed it would be plugged up with dirt and the resistance to gas passage would be too great. To prevent this building up of gas pressure the filter medium is continuously or intermittently sprayed to flush off these dirt particles on the filter medium, thereby keeping the filter medium porous.

In the operation of these filters we propose to run them in the following manner. A layer of dust is in itself an efficient filtering medium and we operate the filter in such a manner as to obtain the combined filtering effect of the filtering medium and the dust. The cleaning spray may be operated continuously by slowly rotating the spray means or the cylinder, as the case may be, or the spraying may be intermittent, being started and stopped as desired. If desired, automatic controls for the motors and water valves may be provided connected to a pressure control which is actuated by the pressure drop in the filter in such a manner as to automatically purge the filtering medium by automatically controlling the pressure drop through it. When the pressure drop exceeds a certain set value, it will automatically cause the sprays to rotate as shown in Figure 1 and cause water to be sprayed on the filtering medium while rotating, or the cylinder to rotate, as in Figure 2, flushing the filtering means in it as it passes the stationary sprays. When the filtering means have been purged to such an extent that the differential pressure drops below the desired differential pressure, the motor actuating the revolving motion and the water valves will automatically be shut off. If desired, the high tension current may be cut off while the spraying takes place. As a purging medium we can also use the cleaned gas itself or any other washing fluid and the purging can be done in many ways which will be obvious to those familiar with the art.

While certain preferred embodiments of the invention have been shown and certain methods of carrying it out have been described, these are to be understood to be illustrative only as we contemplate such changes and modifications as come within the spirit and scope of the appended claims.

We claim:

1. Gas filtration apparatus, comprising a grounded cylindrical filtering medium, high tension electrodes adjacent one side of the medium, means for conveying gas past the electrodes and to the medium, means for conducting gas from the opposite side of the medium, one end of the cylindrical medium being closed, and the edge of the other end having a water seal, and spray means for spraying the medium with cleaning fluid, the medium and spray means being movable relative to each other.

2. Gas filtration apparatus, comprising a grounded metallic filtering cylinder, high tension electrodes adjacent one face of the cylinder, a spray pipe adjacent the opposite face of the cylinder, means for rotating the spray pipe about the cylinder, and means controlled by the pressure drop through the metallic cylinder for actuating the rotation of the spray pipe and the feed of fluid thereto.

3. Gas filtration apparatus, comprising a grounded metallic filtering cylinder, high tension electrodes adjacent one face of the cylinder, a spray pipe adjacent the opposite face of the cylinder, means for rotating the spray pipe about the cylinder, and means controlled by the pressure drop through the metallic cylinder for actuating the rotation of the spray pipe, the feed of fluid thereto, and the supply of current to the electrodes.

4. Gas filtration apparatus, comprising a grounded metallic filtering cylinder, high tension electrodes adjacent the cylinder, a spray pipe adjacent the cylinder, means for rotating the cylinder relative to the spray pipe, and means controlled by the pressure drop through the metallic filtering cylinder to actuate the means for rotating the cylinder, and the means for supplying fluid to the spray pipe.

5. Gas filtration apparatus, comprising a grounded metallic filtering cylinder, high tension electrodes adjacent the cylinder, a spray pipe adjacent the cylinder, means for rotating the cylinder relative to the spray pipe, and means controlled by the pressure drop through the metallic filtering cylinder to actuate the means for rotating the cylinder, the means for supplying fluid to the spray pipe and the control for the supply of electric current to the electrodes.

HERMAN A. BRASSERT.
ARTHUR J. BOYNTON.
JOHN P. GRILLI.